G. W. BROWN.
Corn-Planters.
No. 151,561.
Patented June 2, 1874.
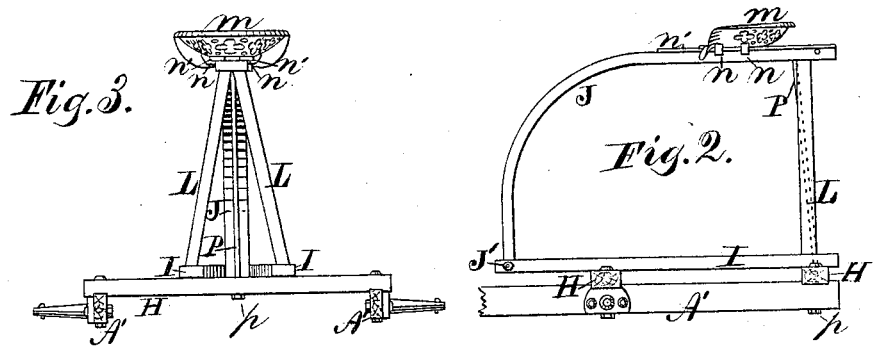
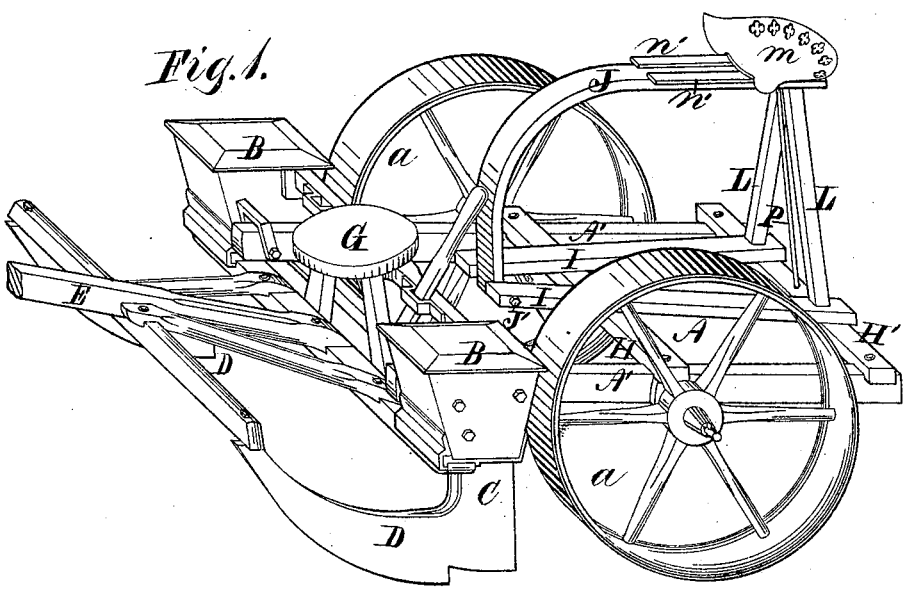

UNITED STATES PATENT OFFICE

GEORGE W. BROWN, OF GALESBURG, ILLINOIS.

IMPROVEMENT IN CORN-PLANTERS.

Specification forming part of Letters Patent No. 151,561, dated June 2, 1874; application filed February 7, 1874.

CASE C.

*To all whom it may concern:*

Be it known that I, GEORGE W. BROWN, of Galesburg, county of Knox and State of Illinois, have invented certain new and useful Improvements in Corn-Planters, of which the following is a specification:

The present invention relates to improvements in that class of corn-planters in which a main frame, supported upon wheels, carries the driver's seat in an elevated position above it, and the runners or furrow-openers, draft-pole, seed boxes and tubes, motive apparatus for operating the dropping devices, and operator's seat pivoted to its forward end; and the invention consists in projecting the forward ends of the seat-supports beyond and in front of the axle, so that the driver, by rising and standing on said projecting parts, can conveniently throw his whole weight, when necessary, forward of the axle, and thereby cause the furrow-openers to cut in where the ground is hard and cloddy, without having recourse to mechanical devices for accomplishing the same result, the portions which constitute the support of the driver's seat being fitted so as to be readily taken apart for convenience of transportation, and be put together again without skilled labor, all as hereinafter more fully set forth.

To enable those skilled in the art to make and use my invention, I will now proceed to describe the manner in which the same is or may be carried into effect, by reference to the accompanying drawing, in which—

Figure 1 is a perspective view of a machine embodying my improvement. Fig. 2 is a side elevation of the seat and its support, together with the adjacent parts of the frame upon which it rests; and Fig. 3 is a rear elevation of Fig. 2.

The similar letters used as marks of reference apply to the like parts in all of the figures.

Letters A' A' in the drawing represent the two sides of the main frame A, supported on wheels *a a*, and carrying at their forward ends the seed-boxes B B, tubes C C, runners D D, tongue E, operator's seat G, and the seed-dropping apparatus, partly shown at Fig. 1, and all of which is too well known to need further description here than a mere reference to Fig. 1. H H' are two transverse framing-bars of the frame A. I I are also two bars, resting upon the bars H H', to which they are secured, their forward ends in close proximity to each other, and their rear ends farther separated. The forward ends of these bars I I project some distance beyond and in front of the axle, for the purpose hereinafter more fully set forth. J is a bar, its forward end secured between the projecting forward ends of the bars I I by a bolt, J', thence upward and curved backward at the desired elevation for the driver's seat, its rear end supported by standards L L, which have their lower ends seated in the rear ends of the bars I I. *m* is the driver's seat, with lugs *n n* on its bottom, which slide beneath the ways *n' n'* on the elevated and horizontal portion of the bar J, and retain the seat upon said bar, while they allow it to slide freely back and forth thereon. P is a rod, its upper end secured in the rear end of the bar J by a countersunk head, and its lower end passing through the transverse bar H', where it is secured by a nut, *p*. The bars I I are secured to the transverse bar H by simple screws. The ends of the posts L L are tenoned and fit into mortises cut in the bars I I, H', and J. To put the parts together, the curved end of the bar J is placed between the projecting ends of the bars I I, and secured by the bolt J'. The posts L L are then put in place and secured by the rod P and nut *p*. When it is desired to take the seat apart for convenience of transportation or other purposes, all that is necessary is to remove the bolt J' and rod P. The seat *m* being attached to the bar J, in the manner described, it is free to slide back and forth, and the operator can thus balance and control the operating parts of the machine, and, through the forward ends of the bars I I projecting beyond the axle, he can increase the pressure on the furrow-openers by standing on said projecting parts, and lend his whole weight to make the runner penetrate stiff, cloddy land, and this without the aid of the mechanical devices heretofore in use for this purpose.

I claim—

The bars I I, projecting beyond and in front of the axle, and combined with the supports J L L and bars H H', substantially as and for the purpose specified.

GEORGE W. BROWN.

Witnesses:
L. S. PERKINS,
J. J. TUNNICLIFF.